Figure 1:
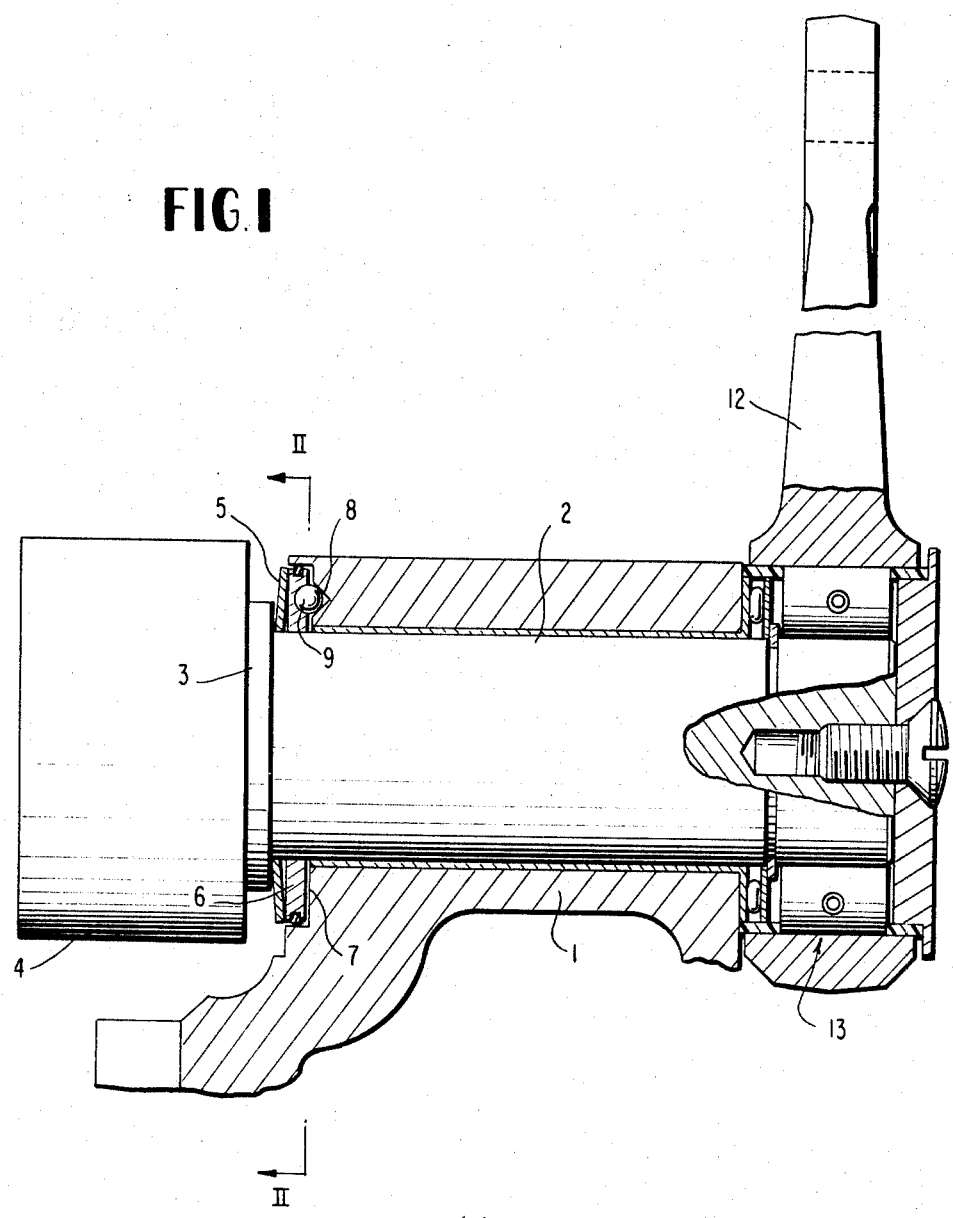

United States Patent
Hase

[15] 3,669,221

[45] June 13, 1972

[54] BRAKE INSTALLATION ESPECIALLY FOR COMMERCIAL-TYPE VEHICLES

[72] Inventor: Helmut Hase, Sulzbach (Murgtal), Germany

[73] Assignee: Daimler-Benz Aktiengesellschaft, Stuttgart-Untertuerkheim, Germany

[22] Filed: June 18, 1970

[21] Appl. No.: 47,364

[30] Foreign Application Priority Data

June 25, 1969 Germany ..................P 19 32 084.4

[52] U.S. Cl. ..................................188/79.5 K, 188/196 BA
[51] Int. Cl. ..................................F16d 65/60, F16d 51/50
[58] Field of Search..................188/79.5 P, 79.5 K, 196 P, 188/196 BA

[56] References Cited

UNITED STATES PATENTS

| 1,860,770 | 5/1932 | Bugatti | 188/79.5 K |
| 1,992,117 | 2/1935 | Bourdon | 188/79.5 K |

*Primary Examiner*—Duane A. Reger
*Attorney*—Craig, Antonelli & Hill

[57] ABSTRACT

A brake installation especially for commercial-type vehicles, in which the brake shoes are actuated by a brake cam shaft, possibly with the assistance of compressed air, and in which an automatic readjusting mechanism is provided that includes a friction member arranged between the brake cam of the brake cam shaft and a control disk; the friction member is effective in the axial direction of the brake cam shaft and is movable with respect to a relatively fixed part of the brake in the circumferential direction within predetermined limits.

21 Claims, 2 Drawing Figures

BRAKE INSTALLATION ESPECIALLY FOR COMMERCIAL-TYPE VEHICLES

The present invention relates to a brake installation especially for commercial-type vehicles in which the brake shoes are actuated by a brake cam shaft possibly with compressed air assist and in which an automatic readjusting mechanism is provided.

The present invention is concerned with the task to provide a simple installation satisfying all requirements without large expenditures, by means of which the brake lining wear and the play resulting therefrom between the brake shoes and brake drums are compensated for.

The underlying problems are solved according to the present invention in that the adjusting mechanism consists of a friction member which is arranged, effective in the axial direction of the brake cam shaft, between the brake cam of the brake cam shaft and a control disk, and in that the control disk is movable with respect to a fixed part of the brake in the circumferential direction within a predetermined play.

According to one embodiment of the present invention, the lever of the brake installation may engage the brake cam shaft by way of a free-wheeling device which locks the lever in the actuating direction.

In one advantageous construction of the present invention, the friction member may be constructed as cup spring.

The control disk may be provided according to the present invention with at least one guide track disposed along a circle, into which engages a guide member supported at the fixed part of the brake.

In accordance with the present invention, three guide members constructed as balls may be provided which are arranged in conically shaped recesses in the fixed part of the brake and engage in guide tracks of the control disk.

Accordingly, it is an object of the present invention to provide a brake installation, especially for commercial-type vehicles which avoids by simple means the aforementioned shortcomings and drawbacks encountered in the prior art.

Another object of the present invention resides in a brake installation especially for trucks and the like which fully satisfies all demands made thereof in a completely satisfactory manner and without excessive expenditures.

A further object of the present invention resides in a brake installation with an automatic readjusting mechanism, especially for commercial-type vehicles, which is simple in construction, involves relatively few parts, and is relatively inexpensive in manufacture and assembly.

Figure 2:
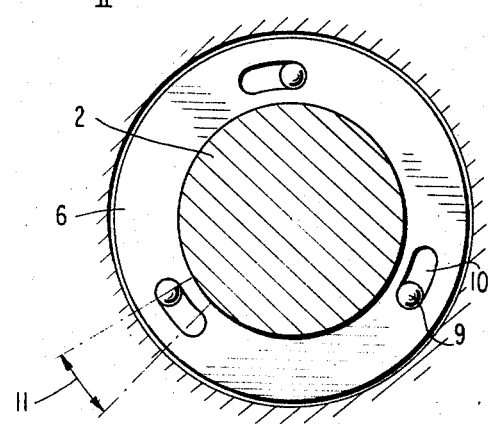

These and other objects, features and advantages of the present invention will become more obvious from the following description when taken in connection with the accompanying drawing which shows, for purposes of illustration only, one embodiment in accordance with the present invention, and wherein:

FIG. 1 is a cross-sectional view through the brake installation in accordance with the present invention; and FIG. 2 is a partial somewhat schematic cross-sectional view of the control disk provided with the guide tracks and balls according to FIG. 1, taken along line II—II.

Referring now to the drawing wherein like reference numerals are used throughout the two views to designate like parts, the brake installation according to FIG. 1 consists of a brake cam shaft 2 supported in a relatively fixed or stationary part 1, which includes at its left end, as viewed in FIG. 1, a brake cam 4 provided with a collar 3.

A friction member 5 constructed as cup spring abuts forcelockingly at the brake cam shaft 2 between the support collar 3 and a control disk 6 which is arranged in a housing-shaped recess 7 of the fixed part 1. The fixed part 1 is provided in the recess 7 with several, conically shaped recesses 8 arranged distributed on a circle, into which engage the guide members 9 of the same number as the recesses and constructed as balls which additionally slide in guide tracks 10 of the control disk 6 as can be seen from FIG. 2. The guide members 9 are freely movable in the guide tracks 10 within the limits of the existing play 11 (FIG. 2). A lever 12 is arranged at the other end of the brake cam shaft 2 under interposition of a conventional free-wheeling device or one-way device generally designated by reference numeral 13 which is rigidly connected with the brake cam shaft in the actuating direction of the brake.

OPERATION

The operation of the stepless, automatic readjusting mechanism of the present invention is as follows:

During a brake operation, the brake cam shaft 2 is steplessly actuated by way of a lever 12 with a locking free-wheeling device 13 with the aid of compressed air, whence the brake shoes (not shown) are pressed against the brake drum (not shown) by reason of the rotary movement of the brake cam 4. The control disk 6 arranged between the brake cam 4 and the fixed part 1 together with the friction member 5 rotates along until the guide members 9 constructed as balls abut in the guide tracks 10 of the control disk 6.

If now as a result of wear of the brake shoe linings an increased play exists between the brake drum and brake shoes, then this undesirable play is overcome with the aid of the friction member 5 which enables with a stationary control disk 6 and after overcoming the play 11, a further rotary movement by the amount of the wear of the brake shoe lining. During the disengagement or release of the brake by the lever 12 by way of the free-wheeling device 13 not locking in this direction, the brake cam 4 and the brake cam shaft 2 are rotated in the disengaging direction by the conventional return spring thereof (not shown). The friction member 5 and the control disk 6 also rotate at that time. The rotary movement of the brake cam 4, of the brake cam shaft 2, of the friction member 5 and of the control disk 6, however, is carried out only so far as is permitted by the play 11 of the control disk 6.

The brake is thus automatically and steplessly readjusted in that with a new brake operation only the given play 11 has to be overcome.

With this automatic readjusting mechanism, it is very important that the frictional engagement between the brake cam 4, the friction member 5 and the control disk 6 must always be larger than the return spring force of the brake shoes.

The lever 12 can return in each case into its initial and end position by the interposition of the free-wheeling device 13.

While I have shown and described only one embodiment in accordance with the present invention, it is understood that the same is not limited thereto but is susceptible of numerous changes and modifications as are within the scope of those skilled in the art, and I therefore do not wish to be limited to the details shown and described herein but intend to cover all such changes and modifications as are encompassed by the scope of the appended claims.

I claim:

1. A brake installation in which the brake shoes are actuated by a brake cam supported on a brake cam shaft and in which an automatic readjusting mechanism is provided; said installation comprising: a fixed part, control disk means arranged between said fixed part and the brake cam and movable within predetermined fixed limits with respect to the fixed part for controlling the rotation of the brake cam, and friction means arranged between the brake cam and the control disk means, said friction means being in frictional sliding contact with at least one of said brake cam and said control disk means for permitting relative rotation of said friction means and the at least one of said control disk means and said brake cam upon the application of a predetermined rotative force to said brake cam whereby the rotative position of the brake cam with respect to the control disk means is automatically readjusted.

2. A brake installation according to claim 1, characterized in that the friction means is effective in the axial direction of the brake cam shaft.

3. A brake installation according to claim 2, in which the brake cam shaft is actuated by a lever, characterized in that the lever is operatively connected with the brake cam shaft by way of a free-wheeling means operable to lock in the actuating direction of the lever.

4. A brake installation according to claim 3, characterized in that the friction means is constructed as a cup spring.

5. A brake installation according to claim 4, characterized in that the control disk means is provided with at least one guide track, and in that a guide means supported at said fixed part engages with said guide track.

6. A brake installation according to claim 5, characterized in that said guide track is disposed substantially along a circle.

7. A brake installation according to claim 6, characterized in that several guide means engaging with respective guide tracks are provided.

8. A brake installation according to claim 5, characterized in that three guide members constructed as balls are provided which are arranged in substantially conically shaped recesses in the fixed part and engage in guide tracks of the control disk means.

9. A brake installation according to claim 6, characterized in that the brake cam shaft is actuated with compressed air of a commercial-type motor vehicle.

10. A brake installation according to claim 1, characterized in that the friction means is constructed as a cup spring.

11. A brake installation according to claim 1, characterized in that the control disk means is provided with at least one guide track, and in that a guide means supported at said fixed part engages with said guide track.

12. A brake installation according to claim 11, characterized in that said guide track is disposed substantially along a circle.

13. A brake installation according to claim 11, characterized in that several guide means engaging with respective guide tracks are provided.

14. A brake installation in which the brake shoes are actuated by a brake cam shaft and in which an automatic readjusting mechanism is provided, said installation including a friction means arranged between the brake cam of the brake cam shaft and a control disk means, said control disk means being movable within predetermined limits with respect to a fixed part of the brake installation, characterized in that three guide members constructed as balls are provided which are arranged in substantially conically shaped recesses in the fixed part and engage in guide tracks of the control disk means.

15. A brake installation according to claim 14, characterized in that each of said guide tracks is disposed substantially along a circle.

16. A brake installation according to claim 10, characterized in that one side of said cup spring abuttingly engages a first annular face on said brake cam, said first annular face extending substantially circumferentially around said brake cam shaft, and in that the other side of the cup spring abuttingly engages a second annular face extending substantially around the axis of the control disk means whereby a uniform axially extending pressure force is exerted around the peripheries of both the control disk means and the brake cam at all times.

17. A brake installation according to claim 16, characterized in that said first annular face is formed on a collar projecting from the brake cam and in that both said first and second faces are substantially perpendicular to the axis of rotation of the cam shaft.

18. A brake installation according to claim 11, characterized in that said guide means includes at least one rotatable member arranged in recess means in the fixed part.

19. A brake installation according to claim 18, characterized in that said recess means includes at least one conically shaped recess and in that said at least one rotatable member is a ball.

20. A brake installation according to claim 1, characterized in that said friction means engages respective faces on said control disk means and said brake cam, said respective faces extending substantially perpendicularly to the axis of rotation of the brake cam shaft.

21. A brake installation according to claim 1, characterized in that said friction means is in frictional sliding contact with both said brake cam and said control disk means.

* * * * *